United States Patent [19]

Kramer et al.

[11] Patent Number: 5,027,740

[45] Date of Patent: Jul. 2, 1991

[54] VALVE CAP PRESSURE DROP INDICATOR

[76] Inventors: Robert Kramer, 23417 Mary, Taylor, Mich. 48180; Henry C. Hart, III, 6498 Edinburgh Dr., Nashville, Tenn. 37221

[21] Appl. No.: 467,483

[22] Filed: Jan. 19, 1990

[51] Int. Cl.[5] .................... B60C 23/04; G01L 17/00
[52] U.S. Cl. ................................ 116/34 R; 116/272; 116/283
[58] Field of Search ............. 73/146.8, 146.3, 744; 116/34 R, 266, 272, 281, 283; 137/227, 228, 229

[56] References Cited

U.S. PATENT DOCUMENTS

| | | | |
|---|---|---|---|
| 1,644,193 | 10/1927 | Kennedy et al. | 116/34 R |
| 2,618,977 | 11/1952 | Hottenroth | 116/34 R |
| 2,903,888 | 9/1959 | Gföll | 116/34 R |
| 4,362,121 | 12/1982 | Pegram | 116/34 R |
| 4,520,664 | 6/1985 | Kramer | 73/146.8 |
| 4,606,391 | 8/1986 | Achterholt | 152/431 |

*Primary Examiner*—Thomas B. Will
*Assistant Examiner*—W. Morris Worth
*Attorney, Agent, or Firm*—Barnes, Kisselle, Raisch, Choate, Whittemore & Hulbert

[57] ABSTRACT

A tire pressure indicator for visual observation of tire pressure including a screw-on cartridge containing a spring-biased piston with a movable shield which covers a central indicator pilot when tire pressure is up to requirements. When pressure is below what it should be, the piston retracts to allow the shield to expose the indicator pilot to the view of an observer, thus serving as a warning that inflation is required. The cartridge is composed of three elements: a screw on base, intermediate element and a transparent sealed top cap. A cup-shaped vessel is movable in the intermediate and top cap sections in response to a subjacent diaphragm and pressure in the tire.

3 Claims, 1 Drawing Sheet

VALVE CAP PRESSURE DROP INDICATOR

FIELD OF INVENTION

Devices to be applied to valve stems on tires which will indicate visually a condition of pressure drop in a tire to initiate an observer to inflate the tire to a proper pressure.

BACKGROUND AND FEATURES OF THE INVENTION

Reference is made to U.S. Pat. No. 4,520,664 issued June 4, 1985 wherein there is disclosed a valve cap pressure drop indicator. Reference is also made to a U.S. Pat. No. 4,606,391 wherein there is disclosed a visual pressure drop indicator.

The present invention is directed to an improvement in construction of an in situ pressure indicator which is of simple construction, more easily sealed for long life use, and readily assembled.

Additional objects and features of the invention will be apparent in the following description and claims in which the principles of the invention are set forth together with details to enable persons skilled in the art to practice the invention, all in connection with the best mode presently contemplated for the invention.

BRIEF DESCRIPTION OF THE DRAWINGS

DRAWINGS accompany the disclosure and the various views thereof may be briefly described as.

DETAILED DESCRIPTION OF THE INVENTION AND THE MANNER AND PROCESS OF USING IT

Figure 1:
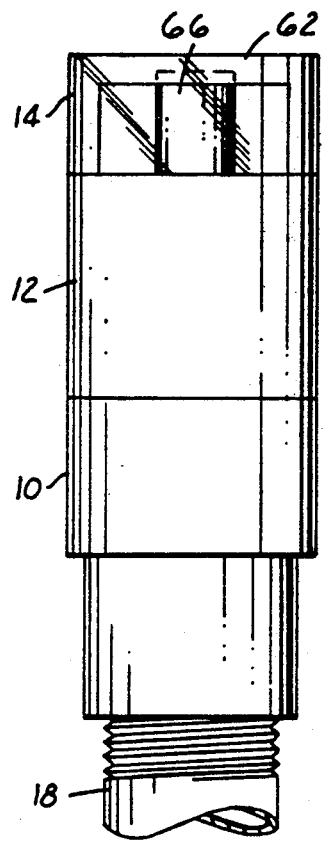
FIG. 1, a view of the assembled indicator installed on a valve stem.

WITH REFERENCE TO THE DRAWINGS, the valve cap indicator is made of three basic housing members, namely, a base cylinder 10, an intermediate cylinder 12, and a top cap 14. The base cylinder 10 has a threaded recess 16 to thread on to a tire valve stem 18. The base cylinder is enlarged at the top to provide a shoulder 20 wherein is located a sealing ring 22. Above the sealing ring 22 is a cup-shaped insert 24 with a dependent projection 26 which serves to depress and open the valve actuator of the valve normally positioned in the valve stem 18. Apertures 28 allows the passage of air through insert 24. The base of the insert 24 seats on the sealing ring 22.

Figure 2:
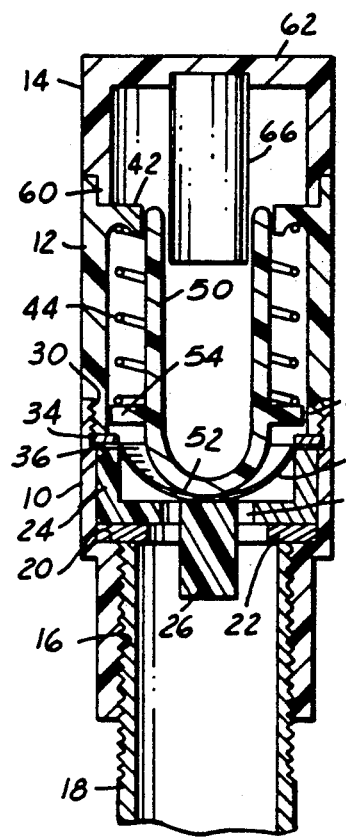
FIG. 2, a sectional view showing the parts in a "deflate" condition exposing a warning indicator.
Figure 3:
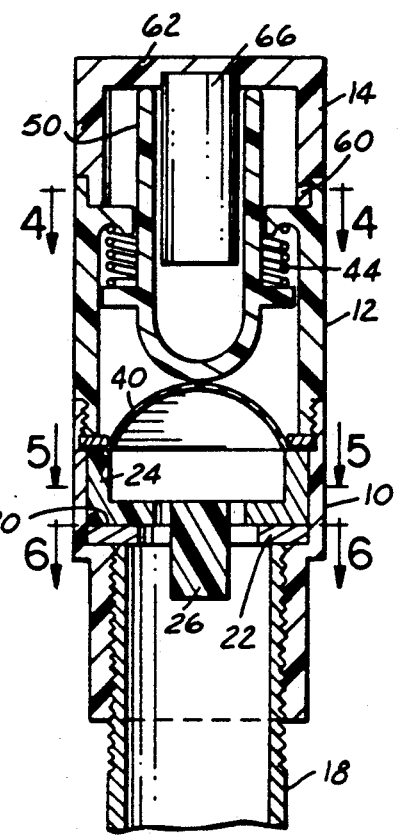
FIG. 3, a view similar to FIG. 2 with the parts in a fully inflated position.
Figure 4:
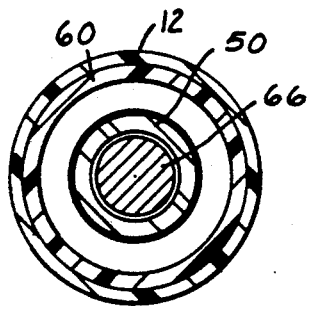
FIGS. 4, 5 and 6, sectional views taken, respectively, on section lines 4—4, 5—5 and 6—6 of FIG. 3.
Figure 5:
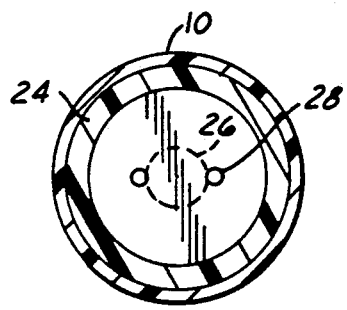
Figure 6:
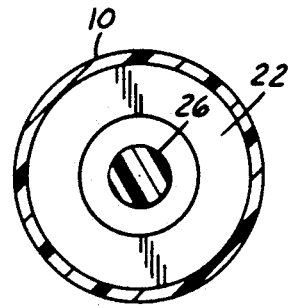

The upper end of housing 10 has an internal threaded portion 30 which receives an ensmalled threaded lower end 32 of the intermediate cylinder 12. The elements 10 and 12 could also be sonic welded rather than threaded together. Between the top rim of the cup insert 24 and the annular lower rim of the cylinder 12 is a sealing ring 34 and the perimeter 36 of a diaphragm 40. When the cylinder 12 is screwed into the base cylinder 10, the periphery of the diaphragm and the sealing ring will be compressed tightly to seal the interior of the valve stem 18 and the interior of the cap insert 24. The interior portion of the diaphragm is domed and flexible so that it may assume the position shown in FIG. 2 or the position shown in FIG. 3.

The upper portion of the cylinder 12 has an inwardly extending flange 42 with an annular groove to serve as a seat for the upper end of a coil spring 44. Within the coil spring and the intermediate cylinder is a hollow, movable shield element 50 having a hemispherical bottom portion 52 bearing against the diaphragm 40. A flange 54 at the lower end serves as a set for the lower end of spring 44.

The top cap 14 is to be formed of a transparent plastic having an annular bottom rim 60 received within a top rim 62 of cylinder 12 and sealed thereon by sonic sealing or a suitable adhesive. Depending from and secured to the closed top 62 of cap 14 is an indicator post 66 which is preferably colored red or phosphorescent orange.

With the parts as described above, it will be seen that when the inflation pressure of a tire existing in stem 18 and acting on diaphragm 40 is below that desired. The spring 44, calibrated for a predetermined pressure, will have pushed the shield element 50 downward to expose the indicator post 66 to view, thus alerting an inspecting person that re-inflation is desirable. The inflation can be accomplished by removing cylinder 10 and applying a pressure hose nozzle to the standard stem 18 in the usual fashion. When the assembled unit is reapplied to the stem 18, the projection 26 depresses the valve stem and the tire pressure is exerted against the diaphragm 40, urging it and the shield element upward to cove the post 66.

We claim:

1. A visual tire pressure indicator for application to a standard tire valve stem which includes:

(a) a housing to be secured at a first end to a standard valve stem, said housing comprising a cylindrical base part having means to thread said base part on a tire valve stem having an open outer end, a hollow, cylindrical intermediate part coaxial with and mounted on the open end of said base part, a projection carried by a cup-shaped valve depressor part housed in said base part to depress and open a tire valve actuator, and axial passages through said valve depressor part to pass pressure from said valve stem to the interior of said base part, and a transparent top cap enclosing and sealing an outer end of said intermediate part, said top cap being an inverted cup-shaped piece in which a lower rim closes said intermediate part, (b) an indicator post depending centrally from a bottom of said top cap extending toward said intermediate part, (c) a hollow shield element within said housing having a top central opening at one end to receive said indicator post, a sealing means between said base and intermediate parts, said shield element being movable by said sealing means in response to pressure in said tire from said intermediate part into said top cap to shield said indicator post from view, (d) spring means to resiliently bias said shield element into said intermediate part to expose said indicator post to view, (e) said sealing means comprises a diaphragm interposed between said base part and said intermediate part, the periphery of said diaphragm being captured and sealed between said parts, said diaphragm being exposed to one end of said shield element to move it against said spring means in response to pressure in said tire valve stem.

2. A visual tire pressure indicator as defined in claim 1 in which said hollow shield element has a closed bottom end and said diaphragm is adjacent said closed end to exert tire pressure on said shield element.

3. A visual tire pressure indicator for application to a standard tire valve stem which includes:

(a) a housing to be secured at a first end to a standard valve stem, said housing comprising a cylindrical base part having means to thread said base part on a tire valve stem having an open outer end, a hollow, cylindrical intermediate part coaxial with and mounted on the open end of said base part, a projection carried by a cup-shaped valve depressor part housed in said base part to depress and open a tire valve actuator, and axial passages through said valve depressor part to pass pressure from said valve stem to the interior of said base part, and a transparent top cap enclosing and sealing an outer end of said intermediate part, said top cap being an inverted cup-shaped piece in which a lower rim closes said intermediate part, (b) an indicator post depending centrally from a bottom of said top cap extending toward said intermediate part, (c) a hollow shield element within said housing having a top central opening at one end to receive said indicator post, a sealing means between said base and intermediate parts, said shield element being movable by said sealing means in response to pressure in said tire from said intermediate part into said top cap to shield said indicator post from view, an internal flange at a top of said intermediate part and an external flange at a bottom of said shield element to confine said shield element radially and to guide said shield element in an up and down motion, said flanges serving also as spring seats for respective ends of a spring means, (d) spring means positioned between said flanges to resiliently bias said shield element into said intermediate part to expose said indicator post to view, and (e) said sealing means comprising a diaphragm interposed between said base and said intermediate part, the periphery of said diaphragm being captured and sealed between said parts, said diaphragm being exposed to one end of said shield element to move it against said spring means in response to pressure in said tire valve stem.

* * * * *